United States Patent
Kolditz et al.

(10) Patent No.: US 8,491,821 B2
(45) Date of Patent: Jul. 23, 2013

(54) COMPOSITIONS COMPRISING PROPYLENE-OLEFIN-COPOLYMER WAXES AND CARBON NANOTUBES

(75) Inventors: Pirko Kolditz, Hamburg (DE); Gerd Hohner, Gersthofen (DE)

(73) Assignee: Clariant Finance (BVI) Limited, Tortola (VG)

( * ) Notice: Subject to any disclaimer, the term of this patent is extended or adjusted under 35 U.S.C. 154(b) by 285 days.

(21) Appl. No.: 13/123,334

(22) PCT Filed: Oct. 30, 2009

(86) PCT No.: PCT/EP2009/007776
§ 371 (c)(1),
(2), (4) Date: Apr. 8, 2011

(87) PCT Pub. No.: WO2010/051942
PCT Pub. Date: May 14, 2010

(65) Prior Publication Data
US 2011/0193030 A1      Aug. 11, 2011

(30) Foreign Application Priority Data
Nov. 6, 2008 (EP) ..................... 08168509

(51) Int. Cl.
*H01B 1/06* (2006.01)
*B60C 1/00* (2006.01)

(52) U.S. Cl.
USPC ............ 252/511; 524/570; 977/742; 977/753

(58) Field of Classification Search
USPC .................... 252/511; 524/570; 977/742, 753
See application file for complete search history.

(56) References Cited

U.S. PATENT DOCUMENTS 3,756,999 A * 9/1973 Stetter ........................ 525/361
4,962,262 A 10/1990 Winter et al.
5,081,322 A 1/1992 Winter et al.
6,331,590 B1 12/2001 Herrmann et al.
2003/0092824 A1 * 5/2003 Bastiaens et al. ............. 524/495
2007/0191510 A1 8/2007 Chaiko
2008/0280202 A1 * 11/2008 Yen et al. .................... 429/210
2009/0140215 A1 6/2009 Buchholz et al.
2011/0193031 A1 8/2011 Kolditz et al.
2011/0200773 A1 8/2011 Kolditz et al.

FOREIGN PATENT DOCUMENTS

| | | |
|---|---|---|
| EP | 0321852 | 6/1989 |
| EP | 0384264 | 8/1990 |
| EP | 1808283 | 7/2007 |
| JP | 2004083889 | 3/2004 |
| JP | 2005190933 | 7/2005 |
| WO | WO 2006050903 | 5/2006 |

OTHER PUBLICATIONS

PCT International Search Report for PCT/EP 2009/007776, mailed Dec. 17, 2009.
PCT Written Opinion of the International Searching Authority for PCT/EP 2009/007776, mailed Dec. 17, 2009.
Wang et al.; "Thermal Properties of Paraffin Based Composites containing Multi-Walled Carbon Nanotubes," Thermochimica Acta, vol. 488; XP 002523259; pp. 39-42, Jan. 30, 2009.
Ullmanns Encyclopedia of Industrial Chemistry Fifth Ed vol. A.28, Weinheim, pp. 151-152 (1996).
McNally et al. "Polyethylene Multi-walled Carbon Nanotube Composites"; Elsevier, Polymer 46; pp. 8221-8232 (2005).
English Abstract for JP 20040833889, Mar. 18, 2004.
English Abstract for JP 2005190933, Jul. 14, 2005.

* cited by examiner

*Primary Examiner* — Mark Kopec
*Assistant Examiner* — Jaison Thomas
(74) *Attorney, Agent, or Firm* — Anthony A. Bisulca

(57) ABSTRACT

The invention relates to compositions comprising certain propylene-olefin-copolymer waxes, and carbon nanotubes (CNTs), the compositions being in the form of masterbatches, compounds or conductive polymers, and their use for producing conductive polymers and articles made of conductive polymers.

16 Claims, No Drawings

COMPOSITIONS COMPRISING PROPYLENE-OLEFIN-COPOLYMER WAXES AND CARBON NANOTUBES

The invention relates to compositions comprising certain propylene-olefin-copolymer waxes, and carbon nanotubes (CNTs), the compositions being in the form of masterbatches, compounds or conductive polymers, and their use for producing conductive polymers and articles made of conductive polymers.

In the plastics industry it is customary to use additives in the form of compounds or masterbatches.

For the purposes of the invention, masterbatches are compositions comprising a carrier polymer and the additive, in which the additive is present in the masterbatch in higher concentrations than in the final application and the carrier polymer is often not the polymer of the final application. Preferred concentrations of the additives in a masterbatch range of from 0.1 to 90% by weight, in particular of from 1 to 80% by weight, based on the total weight of the masterbatch.

For the purposes of the invention, compounds are compositions comprising a polymer and the additive, in which the additive is present in the compound in the desired final concentration of the final application or final article and the polymer is the desired polymer of the final application or final article, so that the compound is merely brought to the desired shape of the final application or final article by means of a physical shaping process.

Conductive compounds and final products made of conductive compounds are, for the purposes of the invention, characterized by an electrical surface resistance of from $10^{-6}$ ohm to $10^{11}$ ohm, preferably of from $10^{-5}$ ohm to $10^{11}$ ohm, in particular of from 0.1 ohm to $10^9$ ohm.

The electrical surface resistance is defined in accordance with DIN EN 61340-5-1 and measured in accordance with DIN EN 61340-2-3 in those cases, where the testing sample shows a dimension of at least 80 mm×120 mm or a diameter of at least 110 mm.

In those cases, where the testing sample shows neither a dimension of at least 80 mm×120 mm nor a diameter of at least 110 mm, the electrical surface resistance is determined in accordance with IEC 93 with a flat sample of the size of 60 mm×40 mm and rectangle electrode size a=40 mm, b=3 mm and g=10 mm directly painted with conductive silver paint on the surface of the sample.

Masterbatches and/or compounds which contain CNTs as additive and are used for producing conductive polyolefins have to satisfy demanding requirements: the compositions should have a very low viscosity in order to give a good processability, they should have a high loading, i.e. a high concentration of the CNTs, and it should be possible to set the desired conductivity in the final article. Further requirements are: high thermal conductivity, in the case of a masterbatch good miscibility and compatibility with the polymer of the final application or the final article, also good dispersion of the CNTs in the masterbatch and/or compound, very small adverse effects on the mechanical and thermal properties of the final article, in particular in respect of impact strength, tensile strength or heat distortion resistance.

Conductive polyolefins are used for producing articles which are used in regions, areas or applications in which there is a high risk of explosion; these will for the purposes of the invention be summarized in the interest of brevity as articles for use in explosion protection.

Furthermore, only conductive polyolefins can be coloured by means of electrostatic powder coatings. This field of use will, for the purposes of the invention, be referred to as electrostatic powder coating.

Furthermore, conductive polyolefins are used to produce packaging which displays little if any electrostatic charging and is used, for example, in the packaging of electronic components.

Conductive polyolefins are also used as bipolar plates in fuel cells.

Compounds comprising polyethylene (PE) and carbon nanotubes (CNTs) are known from "Polyethylene multi-walled carbon nanotube composites", Polymer 46 (2005), 8222 ff.

The known compositions do not satisfy all present-day requirements of industry, as have been mentioned above. There is a need for masterbatches containing CNTs which satisfy present-day requirements and, in particular, have the required viscosity and loading and by means of which the required conductivity of the polyolefins can be set.

Masterbatches comprising certain propylene-olefin-copolymer waxes and CNTs surprisingly display improved properties.

Subject of the invention is a composition Z comprising a component A and a component B, wherein
the component A is a propylene-olefin-copolymer wax, and
the component B is a CNT,
with the propylene-olefin-copolymer wax being made of the monomers propylene and of from 0.1 to 50% by weight of at least one compound of formula (II),

with $R^a$ being selected from the group consisting of H and of unbranched or branched $C_{2-18}$ alkyl;
with the % by weight being based on the total weight of the monomers.

Preferably, the propylene-olefin-copolymer wax is made of propylene and of from 0.1 to 50% by weight, more preferably of from 1 to 40% by weight, even more preferably of from 2 to 30% by weight, especially of from 2 to 20% by weight, with the % by weight being based in each case on the total weight (100%) of the monomers, of at least one, preferably of 1, 2 or 3, more preferably of 1, compound of formula (II).

Preferably, $R^a$ is H, i.e. the propylene-olefin-copolymer wax is a propylene-ethylene-copolymer wax.

Therefore, the combined amounts of the monomers propylene and compound of formula (II) add up to 100% by weight, with the % by weight being based in each case on the total weight (100%) of the monomers.

The composition Z is preferably a masterbatch MB or a conductive polymer CP, with the conductive polymer CP preferably being a conductive organic polymer.

For the purposes of the invention, a conductive polymer CP has a loading-specific surface resistance LSSR of preferably less than or equal to 130, particularly preferably less than or equal to 120, measured on a compression moulded plate produced from the conductive polymer CP; the lower limit at each preferred upper limit for the LSSR is preferably −15 000, particularly preferably −10 000, in particular −1000, especially −100, very especially −10.

Furthermore, for the purposes of the invention, a conductive polymer CP preferably has an LSSR of less than or equal to 530, particularly preferably less than or equal to 400, in particular less than or equal to 300, especially less than or equal to 250, measured on a flat film produced from the conductive polymer CP; the lower limit at each preferred upper limit for the LSSR is preferably −15 000, particularly preferably −10 000, in particular −1000, especially −100, very especially −10.

The LSSR is calculated by multiplication of the logarithm to the base ten of the absolute value of the surface resistance, measured in ohm, by the second power of the absolute value of the loading of the conductive polymer CP by the CNTs in % by weight, with the % by weight being based on the total weight of the conductive polymer CP. Thus, for example, a pressed (compression moulded) plate having a CNT loading of 3% by weight based on the total weight of the pressed (compression moulded) plate and a surface resistance of $1.0*10^{15}$ ohm has an LSSR of 135.

Preferably, the propylene-olefin-copolymer waxes are characterized by a narrower molar mass distribution especially, when they have been synthesized with metallocene catalysis. The molar mass distribution is characterized by the weight average molar mass (Mw value [g/mol]) and the number average molar mass (Mn value [g/mol]).

Preferably, Mn is of from 500 to 50 000 g/mol, more preferably of from 1000 to 35 000 g/mol, even more preferably of from 1100 to 25 000 g/mol.

Preferably, Mw is of from 1000 to 14 0000 g/mol, more preferably of from 1900 to 100 000 g/mol, even more preferably of from 2100 to 70 000 g/mol.

Preferably, Mw divided by Mn, in the following called the Mw/Mn value, is of from 1.0 to 3.0, more preferably of from 1.5 to 2.9, even more preferably of from 1.7 to 2.8; especially of from 2.1 to 2.7; more especially of from 2.2 to 2.5; whereas in case of conventional, non-metallocene catalysed waxes, the Mw/Mn value is at least 3.1 and can go up to 7 or 8.

Possible catalysts, which can be used for the production of the propylene-olefin-copolymer waxes, are preferably Ziegler-Natta-catalysts and metallocene catalysts, e.g. those mentioned in Ullmann's Encyclopedia of Industrial Chemistry, Vol. A 28, Weinheim 1996, S. 151-152.

Propylene-olefin-copolymer waxes, preferably propylene-ethylen-copolymer waxes, can also be manufactured by thermal degradation of suitable high molecular weight propylene-olefin copolymers, preferably propylene-ethylene copolymers.

Preferably, propylene-olefin-copolymer waxes are waxes which have been prepared in the presence of metallocenes as catalyst. The special abilities of metallocene catalysts are used to synthesize propylene-olefin-copolymer waxes with selective and completely new property profiles. The use of metallocene catalysts provides for special combinations of melting point, viscosity and molecular weight of a propylene-olefin-copolymer wax.

The propylene-olefin-copolymer waxes, preferably the metallocene propylene-olefin-copolymer waxes, are preferably largely or completely amorphous and can additionally be modified so as to make them polar if required. For the purposes of the invention, largely means more than 80% by weight, preferably more than 90% by weight, in particular more than 95% by weight, especially more than 99% by weight, the % by weight in each case based on the total weight of the wax.

The metallocene propylene-olefin-copolymer waxes are prepared using metallocene compounds of the formula (I).

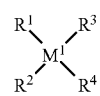

The formula (I) encompasses compounds of the formula (Ia),

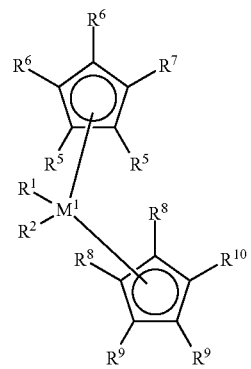

the formula (Ib)

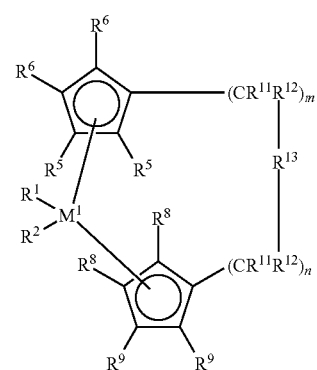

and the formula (Ic)

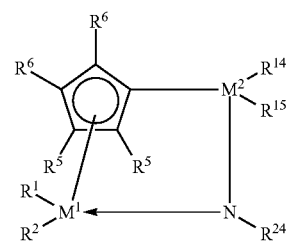

In the formulae (I), (Ia) and (Ib), $M^1$ is a metal of Group IVb, Vb or VIb of the Periodic Table, preferably titanium, zirconium, hafnium, vanadium, niobium, tantalum, chromium, molybdenum, tungsten, particularly preferably titanium, zirconium, hafnium.

$R^1$ and $R^2$ are identical or different and are each, independently of one another, a hydrogen atom, a $C_1$-$C_{10}$—, preferably $C_1$-$C_3$-alkyl group, in particular methyl, a $C_1$-$C_{10}$—, preferably $C_1$-$C_3$-alkoxy group, a $C_6$-$C_{10}$—, preferably $C_6$-$C_8$-aryl group, a $C_6$-$C_{10}$—, preferably $C_6$-$C_8$-aryloxy group, a $C_2$-$C_{10}$—, preferably $C_2$-$C_4$-alkenyl group, a $C_7$-$C_{40}$—, preferably $C_7$-$C_{10}$-arylalkyl group, a $C_7$-$C_{40}$—, preferably $C_7$-$C_{12}$-alkylaryl group, a $C_8$-$C_{40}$—, preferably $C_8$-$C_{12}$-arylalkenyl group or a halogen atom, preferably a chlorine atom.

$R^3$ and $R^4$ are identical or different and are each, independently of one another, a monocyclic or polycyclic hydrocarbon radical which together with the central atom $M^1$ can form a sandwich structure. $R^3$ and $R^4$ are preferably cyclopentadienyl, indenyl, tetrahydroindenyl, benzindenyl or fluorenyl, with the basic skeletons being able to bear additional substituents or be bridged to one another. In addition, one of the radicals $R^3$ and $R^4$ can be a substituted nitrogen atom, where $R^{24}$ has one of the meanings of $R^{17}$ and is preferably methyl, tert-butyl or cyclohexyl.

$R^5$, $R^6$, $R^7$, $R^8$, $R^9$ and $R^{10}$ are identical or different and are each, independently of one another, a hydrogen atom, a halogen atom, preferably a fluorine, chlorine or bromine atom, a $C_1$-$C_{10}$—, preferably $C_1$-$C_4$-alkyl group, a $C_6$-$C_{10}$—, preferably $C_6$-$C_8$-aryl group, a $C_1$-$C_{10}$—, preferably $C_1$-$C_3$-alkoxy group, an —$NR^{16}_2$, —$SR^{16}$, —$OSiR^{16}_3$, —$SiR^{16}_3$ or —$PR^{16}_2$ radical, where $R^{16}$ is a $C_1$-$C_{10}$—, preferably $C_1$-$C_3$-alkyl group or a $C_6$-$C_{10}$—, preferably $C_6$-$C_8$-aryl group or in the case of Si- or P-containing radicals can also be a halogen atom, preferably a chlorine atom, or two adjacent radicals $R^5$, $R^6$, $R^7$, $R^8$, $R^9$ or $R^{10}$ together with the carbon atoms connecting them form a ring. Particularly preferred ligands are the substituted compounds of the basic skeletons cyclopentadienyl, indenyl, tetrahydroindenyl, benzindenyl or fluorenyl.

$R^{13}$ is

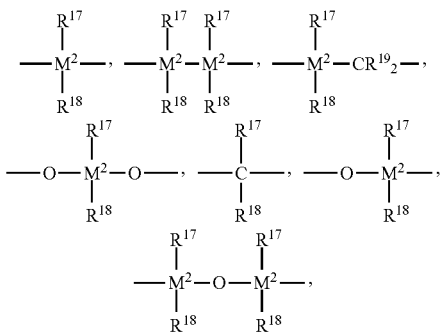

=$BR^{17}$, =$AlR^{17}$, —Ge—, —Sn—, —O—, —S—, =SO, —$SO_2$, —$NR^{17}$, =CO, =$PR^{17}$ or =$P(O)R^{17}$, where $R^{17}$, $R^{18}$ and $R^{19}$ are identical or different and are each, independently of one another, a hydrogen atom, a halogen atom, preferably a fluorine, chlorine or bromine atom, a $C_1$-$C_{30}$—, preferably $C_1$-$C_4$-alkyl group, in particular a methyl group, a $C_1$-$C_{10}$-fluoroalkyl group, preferably a $CF_3$ group, a $C_6$-$C_{10}$-fluoroaryl group, preferably a pentafluorophenyl group, a $C_6$-$C_{10}$—, preferably $C_6$-$C_8$-aryl group, a $C_1$-$C_{10}$—, preferably $C_1$-$C_4$-alkoxy group, in particular a methoxy group, a $C_2$-$C_{10}$—, preferably $C_2$-$C_4$-alkenyl group, a $C_7$-$C_{40}$—, preferably $C_7$-$C_{10}$-aralkyl group, a $C_8$-$C_{40}$—, preferably $C_8$-$C_{12}$-arylalkenyl group or a $C_7$-$C_{40}$—, preferably $C_7$-$C_{12}$-alkylaryl group, or $R^{17}$ and $R^{18}$ or $R^{17}$ and $R^{19}$ together with the atoms connecting them form a ring.

$M^2$ is silicon, germanium or tin, preferably silicon or germanium.

$R^{13}$ is preferably =$CR^{17}R^{18}$, =$SiR^{17}R^{18}$, =$GeR^{17}R^{18}$, —O—, —S—, =SO, =$PR^{17}$ or =$P(O)R^{17}$.

$R^{11}$ and $R^{12}$ are identical or different and independently have one of the meanings of $R^{17}$.

m and n are identical or different and are each 0, 1 or 2, preferably 0 or 1, with m plus n being 0, 1 or 2, preferably 0 or 1.

$R^{14}$ and $R^{15}$ are identical or different and independently have one of the meanings of $R^{17}$ and $R^{18}$.

Preferred metallocenes are:
bis(1,2,3-trimethylcyclopentadienyl)zirconium dichloride,
bis(1,2,4-trimethylcycloperitadienyl)zirconium dichloride,
bis(1,2-dimethylcyclopentadienyl)zirconium dichloride,
bis(1,3-dimethylcyclopentadienyl)zirconium dichloride,
bis(1-methylindenyl)zirconium dichloride,
bis(1-n-butyl-3-methylcyclopentadienyl)zirconium dichloride,
bis(2-methyl-4,6-di-i-propylindenyl)zirconium dichloride,
bis(2-methylindenyl)zirconium dichloride,
bis(4-methylindenyl)zirconium dichloride,
bis(5-methylindenyl)zirconium dichloride,
bis(alkylcyclopentadienyl)zirconium dichloride,
bis(alkylindenyl)zirconium dichloride,
bis(cyclopentadienyl)zirconium dichloride,
bis(indenyl)zirconium dichloride,
bis(methylcyclopentadienyl)zirconium dichloride,
bis(n-butylcyclopentadienyl)zirconium dichloride,
bis(octadecylcyclopentadienyl)zirconium dichloride,
bis(pentamethylcyclopentadienyl)zirconium dichloride,
bis(trimethylsilylcyclopentadienyl)zirconium dichloride,
biscyclopentadienyldibenzylzirconium,
biscyclopentadienyldimethylzirconium,
bistetrahydroindenyizirconium dichloride,
dimethylsilyl-9-fluorenylcyclopentadienylzirconium dichloride,
dimethylsilylbis-1-(2,3,5-trimethylcyclopentadienyl)zirconium dichloride,
dimethylsilylbis-1-(2,4-dimethylcyclopentadienyl)zirconium dichloride,
dimethylsilylbis-1-(2-methyl-4,5-benzindenyl)zirconium dichloride,
dimethylsilylbis-1-(2-methyl-4-ethylindenyl)zirconium dichloride,
dimethylsilylbis-1-(2-methyl-4-i-propylindenyl)zirconium dichloride,
dimethylsilylbis-1-(2-methyl-4-phenylindenyl)zirconium dichloride,
dimethylsilylbis-1-(2-methylindenyl)zirconium dichloride,
dimethylsilylbis-1-(2-methyltetrahydroindenyl)zirconium dichloride,
dimethylsilylbis-1-indenylzirconium dichloride,
dimethylsilylbis-1-indenyldimethylzirconium,
dimethylsilylbis-1-tetrahydroindenylzirconium dichloride,
diphenylmethylene-9-fluorenylcyclopentadienylzirconium dichloride,
diphenylsilylbis-1-indenylzirconium dichloride,
ethylenebis-1-(2-methyl-4,5-benzindenyl)zirconium dichloride,
ethylenebis-1-(2-methyl-4-phenylindenyl)zirconium dichloride,
ethylenebis-1-(2-methyltetrahydroindenyl)zirconium dichloride, ethylenebis-1-(4,7-dimethylindenyl)zirconium dichloride,
ethylenebis-1-indenylzirconium dichloride,
ethylenebis-1-tetrahydroindenylzirconium dichloride,
indenylcyclopentadienylzirconium dichloride,
isopropylidene(1-indenyl)(cyclopentadienyOzirconium dichloride,
isopropylidene(9-fluorenyl)(cyclopentadienyl)zirconium dichloride,
phenylmethylsilylbis-1-(2-methylindenyl)zirconium dichloride,
and also the alkyl or aryl derivatives of these metallocene dichlorides.

To activate the single-site catalyst systems, suitable cocatalysts are used. Suitable cocatalysts for metallocenes of the formula (I) are organoaluminium compounds, in particular aluminoxanes, or aluminium-free systems such as $R^{20}{}_xNH_{4-x}BR^{21}{}_4$, $R^{20}{}_xPH_{4-x}BR^{21}{}_4$, $R^{20}{}_3CBR^{21}{}_4$ or $BR^{21}{}_3$. In these formulae, x is of from 1 to 4, the radicals $R^{20}$ are identical or different, preferably identical, and are each, independently of one another, $C_1$-$C_{10}$-alkyl or $C_6$-$C_{18}$-aryl or two radicals $R^{20}$ together with the atom connecting them form a ring and the radicals $R^{21}$ are identical or different, preferably identical, and are each, independently of one another, $C_6$-$C_{18}$-aryl which may be substituted by alkyl, haloalkyl or fluorine. In particular, $R^{20}$ is ethyl, propyl, butyl or phenyl and $R^{21}$ is phenyl, pentafluorophenyl, 3,5-bistrifluoromethylphenyl, mesityl, xylyl or tolyl.

In addition, a third component is frequently necessary in order to maintain protection against polar catalyst poisons. Organoaluminium compounds such as triethylaluminium, tributylaluminium and others, and also mixtures of these compounds, are suitable for this purpose.

Depending on the process, supported single-site catalysts can also be used. Preference is given to catalyst systems in which the residual contents of support material and cocatalyst do not exceed a concentration of 100 ppm in the product.

The metallocene propylene-olefin-copolymer waxes are known substances, they can be prepared according to EP 0 321 852 A1 or EP 0 384 264 A1.

Preferred metallocene propylene-olefin-copolymer waxes are propylene-ethylene-copolymer waxes and are prepared by copolymerization of propylene with ethylene using the metallocene catalyst dimethylsilylbisindenylzirconium dichloride by the process reported in EP 0 384 264 A, in particular in analogy to the method in Examples 1 to 16.

The propylene-olefin-copolymer waxes are used in a finely particulate state, preferably sprayed or milled, or else in granular form.

Further preference is given to grafted propylene-olefin-copolymer waxes. Preferred grafted propylene-olefin-copolymer waxes are propylene-olefin-copolymer waxes modified with of from 0.5 to 10% by weight of maleic anhydride, the % by weight based on the sum of the weights of the starting materials propylene-olefin-copolymer wax and maleic anhydride.

Preferably, component A comprises 1, 2, 3, or 4, more preferably 1 or 2, even more preferably 1, propylene-olefin-copolymer waxes.

Preferred CNTs are single-wall carbon nanotubes (SWCNTs) or multiwall carbon nanotubes (MWCNTs), with MWCNTs being preferred.

Unless indicated otherwise, a mass-specific surface area is determined by Brunauer Emmet Teller (BET) adsorption measured using nitrogen in accordance with ASTM D3037; this surface area will hereinafter be referred to as BET surface area.

Preferred CNTs have a BET surface area of from 50 to 1000 $m^2$/g, particularly preferably of from 200 to 600 $m^2$/g, in particular of from 250 to 560 $m^2$/g.

Preference is given to MWCNTs having a wall structure made up of from 2 to 50 carbon layers, in particular of from 3 to 15 carbon layers.

Preferred MWCNTs have an average external diameter (defined as the median of the number distribution) of from 1 to 500 nm, particularly preferably of from 2 to 100 nm, in particular of from 3 to 60 nm, especially of from 3 to 20 nm.

There are various techniques and processes for producing CNTs which differ in terms of different methods of production or different catalyst particles. This leads, inter alia, to a differing residual content of catalyst in the CNTs.

Preference is given to CNTs having a residual catalyst content of 20% by weight or less, particularly preferably 8% by weight or less, in particular 5% by weight or less, especially 3% by weight or less, with the % by weight being based in each case on the total weight of the CNTs.

Preference is given to CNTs as are disclosed in WO2006/050903 A and can be obtained by the process disclosed in this document. The disclosure of this document, in particular Claims 1 to 10 in which the technical features of the disclosed process for producing carbon nanotubes and the carbon nanotubes which can be obtained by this process are described, is therefore expressly incorporated by reference at this point.

Particular preference is therefore given to CNTs which can be obtained by decomposition of a gaseous hydrocarbon over a heterogeneous catalyst comprising Mn, Co and a support material, with Co and Mn being present in amounts of from 2 to 98 mol-% based on the total content of active components in metallic form, and optionally additionally contains Mo; particular preference is also given to carbon nanotubes which have a principal diameter of from 3 nm to 150 nm and have been produced using this catalyst; where light hydrocarbons such as aliphatics and olefins, either individually or in admixture, are preferably employed as starting materials and the process is preferably carried out continuously or batchwise, based on the introduction of the catalyst and the discharge of the carbon nanotubes formed with the exhausted catalyst; and the catalyst is preferably introduced into the reaction space in a form in which the main catalytically active components are present as oxides, partially or fully reduced, or as hydroxide. Further details of this process may be found in the description of WO2006/050903 A. In particular, these carbon nanotubes produced in this way surprisingly make it possible to produce compositions Z having a low viscosity and at the same time a high loading; the desired conductivities in the polyolefins can be set; and the surface resistance of the polyolefins is low.

Preference is given to using CNTs which are coated with polyolefins or ethylene-vinyl acetate copolymers. The coating is preferably applied by in-situ polymerization. Particular preference is given to MWCNTs coated with polyethylene and with polypropylene, in particular with polyethylene.

Preference is given to using CNTs which have been made easier to disperse by modification or activation of their surface. Particularly preferred surface treatments of the CNTs are by means of plasma or gamma radiation, with very particular preference being given to plasma-treated MWCNTs.

CNTs can preferably be procured from the companies Mitsui, Arkema, Nanocyl, Thomas Swan & Co Ltd., CNI and in particular Bayer Material Science AG.

As component B, more than 1 CNT can be used, preferably 1, 2 or 3, more preferably 1 or 2, even more preferably 1.

Preferably, the composition Z comprises
0.05 to 99.95% by weight of component A,
0.05 to 99.95% by weight of component B;

more preferably, the composition Z comprises
0.1 to 99.9% by weight of component A,
0.1 to 99.9% by weight of component B;
even more preferably, the composition Z comprises
1 to 99% by weight of component A,
1 to 99% by weight of component B;
the % by weight being in each case based on the weight of the total composition.

The composition Z may comprise further substances.

Further substances are preferably selected from the group consisting of conductive carbon black and graphite.

Preferred conductive carbon blacks have an oil absorption number (OAN) measured in accordance with ASTM D2414 of from 100 to 500 ml/100 g, particularly preferably of from 150 to 400 ml/100 g, in particular of from 170 to 350 ml/100 g.

Preferred conductive carbon blacks have a BET surface area of from 30 to 2000 $m^2/g$, particularly preferably of from 50 to 1500 $m^2/g$, in particular of from 60 to 1250 $m^2/g$.

Conductive carbon blacks can preferably be procured from the companies Cabot, Phelps Dodge, Timcal, Degussa and Akzo.

Preferred graphites have an oil absorption of dibutyl phthalate (DBP) measured in accordance with DIN 53601 of from 30 to 300 g of DBP/100 g, particularly preferably of from 40 to 170 g of DBP/100 g, in particular of from 50 to 150 g of DBP/100 g.

Preferred graphites have a BET surface area of from 0.1 to 50 $m^2/g$, particularly preferably of from 1 to 40 $m^2/g$, in particular of from 1.5 to 30 $m^2/g$.

It is possible to use both naturally occurring graphites and synthetically produced graphites.

Graphite can preferably be procured from the companies Timcal, SGL Carbon or Nationale de Graphite.

The weight ratio of CNTs to conductive carbon black is preferably of from 1:98 to 98:1, particularly preferably of from 1:19 to 19:1, in particular of from 1:9 to 1:1.

The weight ratio of CNTs to graphite is preferably of from 1:98 to 98:1, particularly preferably of from 1:90 to 90:1, in particular of from 1:85 to 1:1.

Preferably, the composition Z contains of from 50 to 90% by weight, more preferably of from 60 to 85% by weight, even more preferably of from 65 to 80% by weight, of graphite, the % by weight based in each case on the weight of the total composition Z.

When CNTs, carbon black and graphite are used, the weight ratio of conductive carbon black to graphite is preferably of from 1:99 to 99:1, particularly preferably of from 1:40 to 40:1, in particular of from 1:20 to 1:1.

Particularly preferably, the composition Z contains both CNTs and graphite.

Particularly preferably, the composition Z contains only CNTs and no graphite and no carbon black.

The weight ratio of the component A to the component B in the composition Z is preferably of from 1:99 to 99:1, particularly preferably of from 1:90 to 90:1, in particular of from 1:85 to 85:1.

When the composition Z contains no graphite and no carbon black, the weight ratio of the component A to the component B in the composition Z is preferably of from 1:1 to 1:50, particularly preferably of from 1:1 to 1:40, in particular of from 1:1 to 1:35.

When the composition Z contains graphite and/or carbon black in addition to CNTs, the weight ratio of the component A to the component B in the composition Z is preferably of from 1:1 to 1:99, particularly preferably of from 1:1 to 1:90, in particular of from 1:1 to 1:85.

The composition Z preferably contains as a further substance a component C, which is one or more, preferably 1, 2 or 3, more preferably 1 dispersant. Preferred dispersants are polar acid esters of $C_{10-30}$ alcohols, in particular $C_{10-30}$ alcohols of alkylsulphonates, neoalkoxytitanates, neoalkoxyzirconates, monoalkoxytitanates or monoalkoxyzirconates. More preferably, component C is a sodium alkylsulphonate, even more preferably sodium $C_{10-18}$-alkylsulphonate. Component C provides for an improved dispersion of the CNT.

The composition Z preferably contains as a further substance a component D, the component D being at least one, preferably 1, 2, 3, 4 or 5, more preferably 1 or 2, even more preferably 1, polar or non-polar wax other than a propylene-olefin-copolymer wax.

Preferably, component D is selected from the group consisting of polyethylene waxes, propylene homopolymer waxes, homopolymers of $C_{4-10}$ 1-olefins and copolymers of ethylene and $C_{4-10}$ 1-olefins.

More preferably, component D is a polyethylene wax or a propylene homopolymeric wax.

More preferably, component D is selected from the group consisting of polyethylene waxes made by a high pressure polymerization or with a Ziegler-Natta catalyst or with a metallocene catalyst, and propylene homopolymeric waxes made with a Ziegler-Natta or a metallocene catalyst; even more preferably these types of waxes have a dropping point or softening point above 100° C., more preferably of from 110 to 170° C., even more preferably of from 115 to 166° C.

The waxes of component D may also be oxidized or grafted. Preferred are oxidized polyethylene waxes, preferably with acid numbers between 5 and 30 mg KOH/g. Preferably, the grafting is done with of from 0.5 to 10% by weight of maleic anhydride, the % by weight based on the total weight of the starting materials used; more preferably, the grafting is done on metallocene polyethylene waxes or on metallocene propylene homopolymeric waxes.

Preferably, in case of metallocene polyolefin waxes as component D, Mn is of from 500 to 50 000 g/mol, more preferably of from 1000 to 35 000 g/mol, even more preferably of from 1100 to 25 000 g/mol.

Preferably, in case of metallocene polyolefin waxes as component D, Mw is of from 1000 to 140 000 g/mol, more preferably of from 1900 to 100 000 g/mol, even more preferably of from 2100 to 70 000 g/mol.

Preferably, in case of metallocene polyolefin waxes as component D, the Mw/Mn value is preferably of from 1.0 to 3.0, more preferably of from 1.5 to 2.9, even more preferably of from 1.7 to 2.8; especially of from 2.1 to 2.7; more especially of from 2.2 to 2.5.

Preferably, in case of non-metallocene polyolefin waxes as component D, the weight average molar mass Mw is in the range of from 1000 to 20 000 g/mol and/or the number average molar mass Mn is in the range of from 500 to 15 000 g/mol.

The weight ratio of component A to component D is preferably of from 10:1 to 1:10, particularly preferably of from 4:1 to 1:4, in particular of from 3:1 to 1:3.

Further subject of the invention is a composition Z comprising the components A and B and a component P, the component P being an organic polymer.

Preferably, the component P is selected from the group consisting of thermoplastic polycondensates, styrene polymers, polyamides, polyesters, polycarbonates, polyacrylates, polyacrylate copolymers, polyacetals, polyadducts, polyolefins, polyolefin copolymers and mixtures of these substances.

The component P is preferably selected from the group consisting of thermoplastic polycondensates, more preferably thermoplastic polyesters, even more preferably polycarbonate (PC), polybutylene terephthalate (PBT) and polyethylene terephthalate (PET).

The component P is preferably selected from the group consisting of styrene polymers, more preferably polystyrene (PS), styrene-acrylonitrile copolymer (SAN), acrylonitrile-polybutadiene-styrene graft polymer (ABS) and styrene-ethylene-butadiene-styrene block copolymers (SEBS).

The component P is preferably selected from the group consisting of polyamides, more preferably polyamide 46 (PA46, polyamide 6/6t (PA6/6T), polyamide 6 (PA6), polyamide 12 (PA12) and polyamide 6.6 (PA6.6).

The component P is preferably selected from the group consisting of polyacrylates,
polyacrylates and polyacrylate copolymers, more preferably polymethyl methacrylate (PMMA) and copolymer of ethylene and methyl acrylate, even more preferably polymethyl methacrylate (PMMA).

The component P is preferably selected from the group consisting of polyacetals, more preferably polyoxymethylene (POM).

The component P and the organic polymer OP are identical or different and independently from each other preferably selected from the group consisting of polyadducts, more preferably polyurethanes, even more preferably thermoplastic polyurethane elastomer (TPU).

The component P is preferably selected from the group consisting of polyolefins and polyolefin copolymers.

When the composition Z is a conductive polymer CP, the component P is preferably a polyolefin or a polyolefin copolymer.

More preferred polyolefins or polyolefin copolymers as component P are selected from the group consisting of
  polyethylene (PE), preferably high density polyethylene (HDPE), medium density polyethylene (MDPE), low density polyethylene (LDPE), linear low density polyethylene (LLDPE), metallocene low density polyethylene (mLDPE) and metallocene linear low density polyethylene (mLLDPE),
  polypropylene (PP), preferably polypropylene homopolymer (PPH), polypropylene random copolymer (PP-R) and polypropylene block copolymers (PP-block-COPO),
  polyolefin plastomers, preferably polymers of 1-octene with ethylene, and
  PE copolymers, preferably ethylene-vinyl acetate copolymers (EVA), copolymers of ethylene and methyl acrylate (EMA), copolymers of ethylene and butyl acrylate (EBA), copolymers of ethylene and ethyl acrylate (EEA), cycloolefin copolymers (COC);
  even more preferably from the group consisting of
  PE, preferably HDPE, LDPE and LLDPE,
  PP, preferably PPH, PP-R and PP-block-COPO,
  polyolefin plastomers, preferably polymers of 1-octene with ethylene, and
  PE copolymers, preferably EVA and EMA.

The composition Z preferably comprises a component E, the component E being a copolymer of ethylene and methyl acrylate. The component E is preferably used when a composition Z, which contains a polymer selected from the group consisting of PC, PBT, PET, PS, SAN, ABS, PA6 or PA6.6 as component P, is to be produced. Component E provides for a better compatibility of the composition Z with the component P.

The composition Z preferably comprises
of from 10 to 100% by weight of the sum of the components A and B,
with the % by weight being based on the total weight of the composition Z.

When the composition Z is a masterbatch MB, the composition Z preferably contains of from 10 to 100% by weight, more preferably of from 50 to 100% by weight, even more preferably of from 70 to 100% by weight, especially of from 95 to 100% by weight, with the % by weight in each case being based on the total weight of the composition Z, of the sum of the components A and B; more especially the composition Z consists of component A and B.

When the composition Z is a masterbatch MB and comprises no graphite and no carbon black, the composition Z preferably comprises
  of from 6 to 97% by weight of component A,
  of from 3 to 94% by weight of component B;
  more preferably
  of from 7.5 to 95% by weight of component A,
  of from 5 to 50% by weight of component B;
  even more preferably
  of from 25 to 90% by weight of component A,
  of from 10 to 47.5% by weight of component B;
  especially
  of from 55 to 90% by weight of component A,
  of from 10 to 45% by weight of component B;
  more especially
  of from 55 to 90% by weight of component A,
  of from 13 to 45% by weight of component B;
  with the % by weight in each case being based on the total weight of the composition Z.

The composition Z preferably comprises
  of from 5 to 99.9% by weight of component P,
  of from 0.1 to 95% by weight of the sum of component A and component B;
  more preferably
  of from 10 to 90% by weight of component P,
  of from 10 to 90% by weight of the sum of component A and component B;
  even more preferably
  of from 12.5 to 90% by weight of component P,
  of from 10 to 87.5% by weight of the sum of component A and component B;
  with the % by weight being based in each case on the total weight of the composition Z;
  especially preferably, the % by weight of the components A, B and P add up the 100%.

When the composition Z is a conductive polymer CP and the composition Z comprises no graphite and no carbon black, the composition Z preferably comprises
  of from 6.0 to 45% by weight of component A,
  of from 0.1 to 10% by weight of component B,
  of from 10 to 93.9% by weight of component P;
  more preferably
  of from 7.5 to 45% by weight of component A,
  of from 0.5 to 9% by weight of component B,
  of from 10 to 92% by weight of component P;
  even more preferably
  of from 10 to 35% by weight of component A,
  of from 1 to 8% by weight of component B,
  of from 10 to 89% by weight of component P;
  in particular
  of from 15 to 35% by weight of component A,
  of from 2 to 8% by weight of component B,
  of from 10 to 83% by weight of component P;
  with the % by weight being based in each case on the total weight of the composition Z.

When the composition Z is a conductive polymer CP and comprises graphite, the composition Z comprises preferably
of from 2.5 to 10% by weight of component A;
of from 0.1 to 10% by weight of component B,
of from 50 to 90% by weight of graphite;
of from 10 to 47.4% by weight of component P;
more preferably
of from 2.5 to 10% by weight of component A;
of from 0.2 to 7.5% by weight of component B,
of from 60 to 85% by weight of graphite;
of from 10 to 37.3% by weight of component P;
even more preferably
of from 3 to 9% by weight of component A;
of from 0.5 to 5% by weight of component B,
of from 65 to 80% by weight of graphite;
of from 10 to 31.5% by weight of component P;
especially preferably
of from 3 to 9% by weight of component A;
of from 0.5 to 4% by weight of component B,
of from 65 to 80% by weight of graphite;
of from 10 to 31.5% by weight of component P;
with the % by weight being based in each case on the total weight of the composition Z.

The composition Z preferably contains of from 0.1 to 10% by weight, particularly preferably of from 0.1 to 5% by weight, in particular of from 0.5 to 3% by weight, with the % by weight being based in each case on the total weight of the composition Z, of component C.

The composition Z preferably contains of from 0.1 to 70% by weight, more preferably of from 5 to 60% by weight, even more preferably from 15 to 35% by weight, with the % by weight being based in each case on the total weight of the composition Z, of component D.

When the composition Z is a masterbatch MB, the composition Z preferably contains of from 0.5 to 70% by weight, more preferably of from 5 to 60% by weight, even more preferably of from 15 to 35% by weight, with the % by weight being based in each case on the total weight of the composition Z, of component D.

When the composition Z is a compound CO, the composition Z preferably contains of from 0.1 to 15% by weight, more preferably of from 5 to 12% by weight, even more preferably of from 6 to 9% by weight, with the % by weight being based in each case on the total weight of the composition Z, of component D.

The composition Z preferably contains of from 0.1 to 50% by weight, particularly preferably of from 10 to 40% by weight, in particular of from 15 to 35% by weight, with the % by weight being based in each case on the total weight of the composition Z, of component E.

The invention further provides a process for producing a composition Z, characterized in that the component A and the component B and any further components are physically mixed with one another.

The mixing of the components can occur in one step or in a plurality of steps.

As mixing apparatuses for physical mixing, it is possible to use the mixing apparatuses customary in the plastics industry, preferably an apparatus selected from the group consisting of extruders, kneaders, presses, injection-moulding machines and blade mixers. When the composition Z is a masterbatch MB, the mixing apparatuses are preferably extruders, kneaders and/or blade mixers. When the composition Z is a conductive polymer CP, the mixing apparatuses are preferably extruders, presses and injection-moulding machines, particularly preferably extruders.

Mixing preferably occurs continuously or batchwise, particularly preferably continuously, in the case of a masterbatch MB preferably by extrusion or kneading, particularly preferably by extrusion, and in the case of a conductive polymer CP preferably by extrusion or injection moulding or pressing, particularly preferably by extrusion.

Mixing is preferably carried out at a temperature of from 80 to 300° C.

In the case of a masterbatch MB, mixing is preferably carried out at a temperature of from 80 to 200° C., particularly preferably of from 100 to 180° C., in particular of from 110 to 150° C.; in the case of a conductive polymer CP, mixing is preferably carried out at a temperature of from 80 to 300° C., particularly preferably of from 100 to 280° C.

The mixing time is preferably of from 5 sec to 10 h.

The mixing time in the case of continuous mixing is preferably of from 5 sec to 1 h, particularly preferably of from 10 sec to 15 min.

The mixing time in the case of batchwise mixing is preferably of from 1 min to 10 h, particularly preferably of from 2 min to 8 h, in particular of from 2 min to 5 h, especially of from 2 min to 1 h, particularly preferably of from 2 to 15 min.

In the case of a conductive polymer CP, the component A and the component B are preferably mixed in the form of a masterbatch MB with the component P.

Furthermore, a premix of the masterbatch MB with pelletized component P is preferably used for physical mixing.

The invention further provides for the use of the composition Z for the production of a conductive polymer CP or as conductive polymer CP.

When the composition Z is a masterbatch MB, the composition Z is preferably used for producing a conductive polymer CP, in particular for producing a conductive polyolefin.

When the composition Z is a conductive polymer CP, the composition Z is preferably used for producing a conductive polyolefin or as conductive polyolefin.

When the composition Z contains a component E, the composition Z is preferably used for producing a conductive nonpolyolefin polymer or as conductive nonpolyolefin polymer.

The production of a conductive polyolefin from a composition Z, in particular from a conductive polymer CP, is carried out by processes analogous to those described above for the production of a composition Z, in particular a conductive polymer CP, with the analogous process steps and process parameters.

For the purposes of the invention, conductive polymers are polymers which have a surface resistance of from $10^{-6}$ ohm to $10^{11}$ ohm, preferably of from $10^{-5}$ ohm to $10^{11}$ ohm, in particular of from 0.1 ohm to $10^9$ ohm.

The compositions Z are preferably used for the production of or as conductive polymers and/or articles made of conductive polymers for use in explosion protection.

The compositions Z are preferably used for the production of or as conductive polymers and/or articles made of conductive polymers which can be coloured by electrostatic powder coating.

The compositions Z are preferably used for the production of or as conductive polymers from which packaging which displays little if any electrostatic chargeability is produced. For the purposes of the invention, little if any electric chargeability preferably means a surface resistance of from $10^{-6}$ ohm to $10^{11}$ ohm, preferably of from $10^{-5}$ ohm to $10^{11}$ ohm, in particular of from 0.1 ohm to $10^9$ ohm, and an electrostatic discharge time to 10% of the original charge of less than or equal to 2 seconds.

The electric chargeability is defined in accordance with DIN EN 61340-5-1 and is measured in accordance with DIN EN 61340-2-1.

The compositions Z are preferably used for the production of or as conductive polymers, preferably conductive polyolefins, which are used as bipolar plates in fuel cells.

Furthermore, the compositions Z are suitable for use as additives in polymers or as polymers, in particular for mechanical reinforcement and for increasing the electrical conductivity, also as material for use in gas and energy storage, for colouring and as flame retardant, as electrode material or for producing conductor tracks and conductive structures and as emitter in displays. The compositions Z are preferably used in or as polymer, ceramic or metal composite materials for improving the electrical or thermal conductivity and mechanical properties, for the production of or as conductive coatings and composite materials, as colorant, in batteries, condensers, displays (e.g. flat screen displays) or phosphors, as field effect transistor, as storage medium for, for example, hydrogen or lithium, in membranes, e.g. for the purification of gases, as catalyst or as support material for, for example, catalytically active components in chemical reactions, in fuel cells, in the medical sector, e.g. as framework for growth control of cell tissues, in the diagnostic field, e.g. as markers, and also in chemical and physical analysis (e.g. in atomic force microscopes).

The composition Z can contain further substances, preferably
- colorants, with organic and inorganic dyes and pigments being possible as colorants; as organic pigments, preference is given to using azo or diazo pigments, coated azo or diazo pigments or polycyclic pigments; preferred polycyclic pigments are diketopyrrolopyrrole, phthalocyanine, quinacridone, perylene, dioxazine, anthraquinone, thioindigo, diaryl or quinophthalone pigments; as inorganic pigments, preference is given to using metal oxides, mixed oxides, aluminium sulphates, chromates, metal powders, pearl-effect pigments (mica), luminous pigments, titanium oxides, cadmium-lead pigments, iron oxides, carbon black, silicates, nickel titanates, cobalt pigments or chromium oxides suitable for pigmentation;
- fillers such as silica, zeolites, silicates such as aluminium silicates, sodium silicate, calcium silicates, chalk, talc;
- auxiliaries, preferably stearates, blowing agents, nucleating agents, peroxides, antioxidants;
- antistatics, preferably glyceryl stearate, glyceryl monostearate, alkylamines, ethoxylated alkylamines, alkylsulphonates, glyceryl esters or mixtures (blends) thereof;
- UV absorbers and hindered amine light stabilizer (HALS) compounds, slip agents, antifogging agents, anticondensation agents and/or suspension stabilizers, flame retardants; antioxidants or other customary plastics additives;
- or mixtures of these.

The compositions Z, both in the form of a masterbatch MB or in the form of a conductive polymer CP, are surprisingly characterized by a low viscosity which can be obtained at the same time as a high loading with CNTs; in particular, a loading of the masterbatch MB with up to 20% by weight, even up to 25% by weight, in many cases even up to 30% by weight and sometimes even more, of CNTs can be achieved, with the % by weight being based on the total weight of the masterbatch MB, without the viscosity becoming so poor that the masterbatch MB can no longer be produced and processed, or a masterbatch not being formed at all; furthermore, the desired conductivities and the desired low surface resistances can be set in the conductive polyolefins. The high solids content combined with a low viscosity makes inexpensive introduction of additives into the polymer possible; also, the wear on the moulds is minimized and rapid homogenization and uniform distribution of the CNTs is possible.

In the compositions Z, the CNTs are well dispersed. The quality of dispersion is determined qualitatively by optical means on pressed (compression moulded) plates or films. The flowability, the impact toughness, the heat distortion temperature (i.e. the temperature of deflection under load) and the tensile strength also satisfy requirements. The viscosity or the flowability is determined in accordance with DIN ISO 1133 and expressed as the melt flow rate MFR, the impact toughness is determined in accordance with DIN EN ISO 179, the heat distortion temperature (i.e. the temperature of deflection under load) is determined in accordance with DIN EN ISO 75-1 and the tensile strength is determined in accordance with DIN EN ISO 527-1.

Further test methods:

The product properties are determined by the following methods, unless indicated otherwise:

Determination of the molar masses and molar mass distribution, i.e. the Mw and the Mn values, is done by gel permeation chromatography (GPC) according to DIN 55672, but at a temperature of 135° C. and in the solvent 1,2-dichlorobenzene, where the waxes are completely dissolved; for calibration commercially available PE standards are used.

Determination of the dropping point is carried out using an Ubbelohde dropping point instrument in accordance with DIN 51801/2 (° C.).

Determination of the ring/ball softening point is done in accordance with DIN EN 1427 (° C.). For the purpose of accuracy, if the softening point is given as an integer number in the description or in the claims, it stands for "0.0 C", for example "130 C" stands for "130.0 C"; if not otherwise stated.

Determination of the viscosity of the waxes in accordance with DIN 53018 (mPa*s)

Determination of the density in accordance with ISO 1183 (g/cm$^3$)

Determination of the bulk density by DIN EN ISO 60 (kg/m3)

Determination of the saponification number by ISO 3681 (mgKOH/g)

Determination of the acid number by ISO 2114 (mgKOH/g)

Determination of modulus of elasticity by DIN EN ISO 527-1 (MPa).

The method SR-1 of determining the electrical surface resistance is in accordance with DIN EN 61340-2-3.

The method SR-2 of determining the electrical surface resistance is in accordance with IEC 93.

Measurement method for melting point: differential scanning calorimetry (DSC) in accordance with ISO 3146.

The torque (in Nm) of the extruder and the melt pressure at the extruder head (in bar) were read off on the machine and are a measure of the viscosity or the flowability of the melt in the extruder.

EXAMPLES

Substances Used:

Component A1: propylene-ethylene-copolymer wax having an ethylene content of from 11 to 13% by weight based on the total weight of monomers, with a Mn value of 2900, a Mw value of 6400 g/mol, a Mw/Mn value of 2.2 g/mol and a density of from 0.86 to 0.89 g/cm$^3$.

Component A2: propylene-ethylene-copolymer wax having an ethylene content of from 8 to 10% by weight based on the total weight of monomers, with a Mn value of 6700 g/mol, a Mw value of 15 500 g/mol, a Mw/Mn value of 2.3 and a density of from 0.86 to 0.89 g/cm³.

Component A3: propylene-ethylene-copolymer wax having an ethylene content of from 10 to 12% by weight based on the total weight of monomers, with a Mn value of 11 200 g/mol, a Mw value of 25 200 g/mol, a Mw/Mn value of 2.3 and a density of from 0.86 to 0.89 g/cm³.

Component B1: MWCNTs which have been produced by decomposition of a gaseous hydrocarbon over a heterogeneous catalyst containing Mn, Co and a support material, with Co and Mn being present in metallic form in amounts of from 2 to 98 mol-%, based on the content of active components, and optionally, in addition, Mo and have an average external diameter (defined as the median of the number distribution) of from 10 to 16 nm, a wall structure made up of from 3 to 15 carbon layers, a residual catalyst content of less than 6% by weight, a length of from 1 to 10 microns and a bulk density of from 150 to 350 kg/m³.

Component B2: synthetic graphite having an oil absorption of dibutyl phthalate (DBP) measured in accordance with DIN 53601 of 52 g of DBP/100 g and a BET surface area of 3 m²/g.

Component B3: conductive carbon black having an oil absorption number (OAN) of 320 ml/100 g and a BET surface area of >700 m²/g.

Component C1: sodium $C_{12}$-$C_{18}$-alkylsulphonate having an active substance content of at least 90% by weight, based on the total weight Component D1: nonpolar polyethylene wax homopolymer, produced using by Ziegler-Natta catalysts, having a viscosity of from 640 to 660 mPa*s, measured at 140° C., a dropping point in the range of from 117 to 122° C., a density of from 0.92 to 0.94 g/cm³ (measured at 20° C.), an acid number of 0 mg KOH/g, a Mn value of 1800 g/mol, a Mw value of 5600 g/mol, a Mw/Mn value of 3.1 and a saponification number of 0 mg KOH/g.

Component D2: nonpolar polypropylene wax homopolymer, produced using by Ziegler-Natta catalysts, having a viscosity of from 1500-1800 mPa*s, measured at 170° C., a dropping point in the range of from 160 to 166° C., a density of from 0.88 to 0.90 g/cm³ (measured at 20° C.), an acid number of 0 mg KOH/g, a Mn value of 2500 g/mol, a Mw value of 18 000 g/mol, a Mw/Mn value of 7.2 and a saponification number of 0 mg KOH/g.

Component D3: maleic anhydride-modified polyethylene metallocene polyolefin wax having a viscosity of from 130 to 150 mPa*s, measured at 140° C., a dropping point of from 122 to 125° C., a density of from 0.97 to 1.00 g/cm³, a Mn value of 1200 g/mol, a Mw value of 3000 g/mol, a Mw/Mn value of 2.5 and an acid number of from 17 to 19 mg KOH/g.

Component D4: propylene homopolymer wax having a viscosity of from 1500 to 2000 mPa*s, measured at 170° C., a softening point of from 160 to 166° C., a Mn value of 7100 g/mol, a Mw value of 19 300 g/mol, a Mw/Mn value of 2.7 and a density of from 0.88 to 0.92 g/cm³.

Component E1: copolymer of ethylene and methyl acrylate containing 24% by weight of methyl acrylate and having a density of 0.944 g/cm³, a melt flow rate of 2 g/10 min (measured at 190° C. using a weight of 2.16 kg) and a melting point of 91° C.

Component P1: polyolefin plastomer (polymer of 1-octene with ethylene) having a density of 0.87 g/cm³, a melt flow rate of from 450 to 550 g/10 min (measured at 190° C. and a weight of 2.16 kg) and a melting point of from 69 to 71° C.

Component P2: HDPE having a density of 0.945 g/cm³, an MFR of 6 g/10 min (measured at 190° C./21.6 kg) and a melting point of 131° C.

Component P3: HDPE having a density of 0.956 g/cm³, an MFR of 30.0 g/10 min (measured at 190° C./21.6 kg) and a modulus of elasticity of 1250 MPa.

Component P4: PPH having a density of 0.91 g/cm³, an MFR of 120 g/10 min (measured at 230° C./2.16 kg) and a modulus of elasticity of 1450 MPa.

% by weight mentioned in the following are based on the total weight of the mixture or the article; parts are parts by weight; "Comp." means Comparative Example; unless indicated otherwise.

Example 1

85 parts of component A3 and 15 parts of component B1 are homogenized together on a twin-screw extruder (temperature of the extruder: 100 to 160° C.). A masterbatch MB1 is obtained.

Example 2

85 parts of component A2 and 15 parts of component B1 are homogenized together on a twin-screw extruder (temperature of the extruder: 160 to 200° C.). A masterbatch MB2 is obtained.

Comparative Example 3

85 parts of component P1 and 15 parts of component B1 are homogenized together on a twin-screw extruder (temperature of the extruder: 160 to 200° C.). A masterbatch MB3 is obtained.

Example 4

57.5 parts of component A3, 27.5 parts of component E1 and 15 parts of component B1 are homogenized together on a twin-screw extruder (temperature of the extruder: 160 to 200° C.). A masterbatch MB4 is obtained.

Comparative Example 5

85 parts of component P3 and 15 parts of component B1 are homogenized together on a twin-screw extruder (temperature of the extruder: 220 to 240° C.). A masterbatch MB5 is obtained.

Example 10

73 parts of component A1, 25 parts of component B1 and 2 parts of component C1 are homogenized together on a twin-screw extruder (temperature of the extruder: 100 to 130° C.). A masterbatch MB10 is obtained.

Example 11

38 parts of component A2, 35 parts of component D3, 25 parts of component B1 and 2 parts of component C1 are homogenized together on a twin-screw extruder (temperature of the extruder: 100 to 160° C.). A masterbatch MB11 is obtained.

Comparative Example 12

58 parts of component P2, 25 parts of component D1, 15 parts of component B1 and 2 parts of component C1 are homogenized together on a twin-screw extruder (temperature of the extruder: 200 to 220° C.). A masterbatch MB12 is obtained.

Example 13

50 parts of component A2, 25 parts of component D4, 25 parts of component B1 are homogenized together on a twin-screw extruder (temperature of the extruder: 100 to 160° C.). A masterbatch MB13 is obtained.

Comparative Example 20

17 parts of component P4 and 83 parts of component B2 are homogenized together on a twin-screw extruder (temperature of the extruder: 230-260° C.). A masterbatch MB20 is obtained. The masterbatch MB20 is very brittle and is difficult to pelletize.

Comparative Example 21

17 parts of component P4, 78 parts of component B2 and 5 parts of component B3 are homogenized together on a twin-screw extruder (temperature of the extruder: 230-260° C.). A masterbatch MB21 is obtained. The masterbatch MB21 is very brittle and is difficult to pelletize.

Example 22

78 parts of component A1, 2 parts of component C1 and 20 parts of component B1 are homogenized together on a twin-screw extruder (temperature of the extruder: 100-130° C.). A masterbatch MB22 is obtained. The masterbatch MB22 is not brittle and can be pelletized readily.

Example 23

63 parts of component A1, 15 parts of component D3, 2 parts of component C1 and 20 parts of component B1 are homogenized together on a twin-screw extruder (temperature of the extruder: 100-130° C.). A masterbatch MB23 is obtained. The masterbatch MB23 is not brittle and can be pelletized readily.

Comparative Example 25

Example 22 was repeated with the only difference being that the component D1 was used in place of the component A1.

It was not possible to produce a masterbatch since a pulverulent mass which was not cohesive came out of the die head instead of a strand of extrudate.

Comparative Example 26

Example 22 was repeated with the only difference being that the component D2 was used in place of the component A1.

It was not possible to produce a masterbatch since a pulverulent mass which was not cohesive came out of the die head instead of a strand of extrudate.

Example 27

65 parts of component A2, and 35 parts of component B1 are homogenized together on a twin-screw extruder (temperature of the extruder: 120 to 180° C.). A masterbatch MB27 is obtained.

Example 28

60 parts of component A2, and 40 parts of component B1 are homogenized together on a twin-screw extruder (temperature of the extruder: 120 to 180° C.). A masterbatch MB28 is obtained.

Example 29

55 parts of component A2, and 45 parts of component B1 are homogenized together on a twin-screw extruder (temperature of the extruder: 120 to 180° C.). A masterbatch MB29 is obtained.

The measurement results for the flowability are reported in Table A as the melt flow rate MFR and are measured directly on the masterbatch.

TABLE A

| Example | Pressed (Compression moulded) plate Designation | Loading [% by weight] | MFR parameters [° C./kg] | MFR result [g/10 min] |
|---|---|---|---|---|
| 1 | MB1 | 15 | 190/2.16 | >100 |
| 2 | MB2 | 15 | 190/2.16 | >100 |
| Comp. 3 | MB3 | 15 | 190/2.16 | <0.1 |
| 4 | MB4 | 15 | 190/2.16 | >100 |
| Comp. 5 | MB5 | 15 | 190/2.16 | <0.1 |
| 10 | MB10 | 25 | 190/10 | 12.0 |
| 11 | MB11 | 25 | 190/10 | 6.0 |
| Comp. 12 | MB12 | 15 | 190/10 | <1.0 |
| 13 | MB13 | 25 | 190/2.16 | >100 |

The masterbatches MB3, 5 and 12 are very hard and difficult to distribute in the polymer.

Example 51

20 parts of a masterbatch MB1 produced as described in Example 1 were homogenized and mixed with 80 parts of component P3 on a roll mill (a two roll mill was used) (Labtech) and pressed (compression moulded) on a heated hydraulic platen press at 200° C. for 2 minutes and subsequently cooled to room temperature.

The pressed (compression moulded) plates 20MB1 (the designation means 20 parts of a masterbatch MB1 produced as described in Example 1) were obtained.

Example 52, Comparative Example 53, Example 54 and Comparative Example 55

As in Example 50, 20 parts of a masterbatch MB2 to MB5 produced as described in Examples 2 to 5 were in each case homogenized and mixed with 80 parts of component P3 on a roll mill (a two roll mill was used) (Labtech) and pressed (compression moulded) on a heated hydraulic platen press at 200° C. for 2 minutes and subsequently cooled to room temperature.

The pressed (compression moulded) plates 20MB2, 20MB3, 20MB4 and 20MB5 (designation analogous to Example 51) were obtained.

Comparative Example 61, Example 62, Comparative Example 63, Example 64 and Comparative Example 65

30 parts of a masterbatch MB1 to MB5 produced as described in Examples 1 to 5 were in each case homogenized and mixed with 70 parts of component P3 on a roll mill (a two roll mill was used) (Labtech) and pressed (compression moulded) on a heated hydraulic platen press at 200° C. for 2 minutes and subsequently cooled to room temperature. The pressed (compression moulded) plates 30MB1 to 30MB5 were obtained (designation analogous to Example 51).

Example 71, Example 72, Comparative Example 73, Example 74 and Comparative Example 75

40 parts of a masterbatch MB1 to MB5 produced as described in Examples 1 to 5 were homogenized and mixed with 60 parts of component P3 on a roll mill (Labtech) and pressed (compression moulded) on a heated hydraulic platen press at 200° C. for 2 minutes and subsequently cooled to room temperature. The pressed (compression moulded) plates 40MB1 to 40MB5 were obtained (designation analogous to Example 51).

The pressed (compression moulded) plates were subsequently conditioned at 23° C. and 50% relative humidity for at least 24 hours. The surface resistances were subsequently measured according to SR-2.

The measurement results are shown in Table B.

TABLE B

| Example | Pressed (Compression moulded) plate, thickness 2 mm Designation | CNT loading [% by weight] | Surface resistance SR-2 [Ohm] | LSSR |
| --- | --- | --- | --- | --- |
| 51 | 20MB1 | 3 | >1.0 * $10^{15}$ | >135 |
| 52 | 20MB2 | 3 | 6.0 * $10^9$ | 88 |
| Comp. 53 | 20MB3 | 3 | >1.0 * $10^{15}$ | >135 |
| 54 | 20MB4 | 3 | >1.0 * $10^{15}$ | >135 |
| Comp. 55 | 20MB5 | 3 | >1.0 * $10^{15}$ | >135 |
| Comp. 61 | 30MB1 | 4.5 | 5.0 * $10^{12}$ | 258 |
| 62 | 30MB2 | 4.5 | 1.0 * $10^4$ | 81 |
| Comp. 63 | 30MB3 | 4.5 | 3.0 * $10^{11}$ | 234 |
| 64 | 30MB4 | 4.5 | 3.0 * $10^4$ | 91 |
| Comp. 65 | 30MB5 | 4.5 | >1.0 * $10^{15}$ | >304 |
| 71 | 40MB1 | 6 | 3.0 * $10^3$ | 125 |
| 72 | 40MB2 | 6 | 2.0 * $10^3$ | 119 |
| Comp. 73 | 40MB3 | 6 | 1.0 * $10^4$ | 144 |
| 74 | 40MB4 | 6 | 2.0 * $10^3$ | 119 |
| Comp. 75 | 40MB5 | 6 | >1.0 * $10^{15}$ | >540 |

Example 80

30 parts of a masterbatch MB10 produced as described in Example 10 were premixed with 70 parts of component P2 in a tumble mixer and mixed and homogenized in a Brabender single-screw extruder having a mixing section (temperature: 175 to 190° C.). A 0.7 mm thick flat film FF10 was obtained by extrusion through a flat film die.

Example 81

30 parts of a masterbatch MB11 produced as described in Example 11 were premixed with 70 parts of component P2 in a tumble mixer and mixed and homogenized in a Brabender single-screw extruder having a mixing section (temperature: 175 to 190° C.). A 0.7 mm thick flat film FF11 was obtained by extrusion through a flat film die.

Comparative Example 82

50 parts of a masterbatch MB12 produced as described in Example 12 were premixed with 50 parts of component P2 in a tumble mixer and mixed and homogenized in a Brabender single-screw extruder having a mixing section (temperature: 175 to 190° C.). A 0.7 mm thick flat film FF12 was obtained by extrusion through a flat film die.

The flat films were subsequently conditioned at 23° C. and 50% relative humidity for at least 24 hours. The surface resistances were subsequently measured according to SR-1.

The measurement results are shown in Table C.

Example 83

30 parts of a masterbatch MB13 produced as described in Example 13 were premixed with 70 parts of component P2 in a tumble mixer and mixed and homogenized in a Brabender single-screw extruder having a mixing section (temperature: 175 to 190° C.). A 0.7 mm thick flat film FF13 was obtained by extrusion through a flat film die.

TABLE C

| Example | Flat film Designation | Loading [% by weight] | Surface resistance SR-1 [Ohm] | LSSR |
| --- | --- | --- | --- | --- |
| 80 | FF10 | 7.5 | 1.0 * $10^4$ | 225 |
| 81 | FF11 | 7.5 | 2.0 * $10^3$ | 186 |
| Comp. 82 | FF12 | 7.5 | 1.0 * $10^{10}$ | 562.5 |
| 83 | FF13 | 7.5 | 2.0 * $10^3$ | 186 |

Comparative Example 90

100 parts of a masterbatch MB20 produced as described in Comparative Example 20 were mixed and homogenized in a Brabender single-screw extruder having a mixing section (temperature: 260 to 275° C.). A 1.5 mm thick plate EP20 was obtained by extrusion through a flat film die.

Example 91

95 parts of a masterbatch MB20 produced as described in Comparative Example 20 and 5 parts of a masterbatch MB22 produced as described in Example 22 were premixed in a tumble mixer and mixed and homogenized in a Brabender single-screw extruder having a mixing section (temperature: 260 to 275° C.). A 1.5 mm thick plate EP21 was obtained by extrusion through a flat film die.

Example 92

95 parts of a masterbatch MB20 produced as described in Comparative Example 20 and 5 parts of a masterbatch MB23 produced as described in Example 23 were premixed in a tumble mixer and mixed and homogenized in a Brabender single-screw extruder having a mixing section (temperature: 260 to 275° C.). A 1.5 mm thick plate EP22 was obtained by extrusion through a flat film die.

Comparative Example 93

100 parts of a masterbatch MB21 produced as described in Comparative Example 21 were mixed and homogenized in a Brabender single-screw extruder having a mixing section (temperature: 260 to 275° C.). A 1.5 mm thick plate EP23 was obtained by extrusion through a flat film die.

Example 94

95 parts of a masterbatch MB21 produced as described in Comparative Example 21 and 5 parts of a masterbatch MB22 produced as described in Example 22 were premixed in a tumble mixer and mixed and homogenized in a Brabender single-screw extruder having a mixing section (temperature: 260 to 275° C.). A 1.5 mm thick plate EP24 was obtained by extrusion through a flat film die.

Example 95

90 parts of a masterbatch MB21 produced as described in Comparative Example 21 and 10 parts of a masterbatch MB22 produced as described in Example 22 were premixed in a tumble mixer and mixed and homogenized in a Brabender single-screw extruder having a mixing section (temperature: 260-275° C.). A 1.5 mm thick plate EP25 was obtained by extrusion through a flat film die. The speed of rotation of the Brabender single-screw extruder was a constant 80 revolutions per minute in all experiments. The measurement results are shown in Table D.

TABLE D

| Example | Extruded plate Designation | Torque [Nm] | Melt pressure [bar] | Surface resistance SR-2 [Ohm] |
|---|---|---|---|---|
| Comp. 90 | EP20 | 47.0 | 149 | 0.80 |
| 91 | EP21 | 31.2 | 114 | 0.53 |
| 92 | EP22 | 37.0 | 125 | 0.66 |
| Comp. 93 | EP23 | 44.0 | 185 | 1.00 |
| 94 | EP24 | 29.0 | 101 | 0.70 |
| 95 | EP25 | 25.0 | 90 | 0.59 |

The following Tables E, F, and G give an overview over the components used in Examples 1-94

TABLE E

| Example | Masterbatch | T-Extr [° C.] | A1 | A2 | A3 | B1 | B2 | B3 | C1 | D1 | D2 | D3 | D4 | E1 | P1 | P2 | P3 | P4 |
|---|---|---|---|---|---|---|---|---|---|---|---|---|---|---|---|---|---|---|
| 1 | MB1 | 100-160 | — | — | 85 | 15 | — | — | — | — | — | — | — | — | — | — | — | — |
| 2 | MB2 | 160-200 | — | 85 | — | 15 | — | — | — | — | — | — | — | — | — | — | — | — |
| Comp. 3 | MB3 | 160-200 | — | — | — | 15 | — | — | — | — | — | — | — | — | 85 | — | — | — |
| 4 | MB4 | 220-240 | — | — | 57.5 | 15 | — | — | — | — | — | — | — | 27.5 | — | — | — | — |
| Comp. 5 | MB5 | 220-240 | — | — | — | 15 | — | — | — | — | — | — | — | — | — | — | 85 | — |
| 10 | MB10 | 100-130 | 73 | — | — | 25 | — | — | 2 | — | — | — | — | — | — | — | — | — |
| 11 | MB11 | 100-160 | — | 38 | — | 25 | — | — | 2 | — | — | 35 | — | — | — | — | — | — |
| Comp. 12 | MB12 | 200-220 | — | — | — | 15 | — | — | 2 | 25 | — | — | — | — | — | 58 | — | — |
| 13 | MB13 | 100-160 | — | 50 | — | 25 | — | — | — | — | — | — | — | 25 | — | — | — | — |
| Comp. 20 | MB20 | 230-260 | — | — | — | — | 83 | — | — | — | — | — | — | — | — | — | — | 17 |
| Comp. 21 | MB21 | 230-260 | — | — | — | — | 78 | 5 | — | — | — | — | — | — | — | — | — | 17 |
| 22 | MB22 | 100-130 | 78 | — | — | 20 | — | — | 2 | — | — | — | — | — | — | — | — | — |
| 23 | MB23 | 100-130 | 63 | — | — | 20 | — | — | 2 | — | — | 15 | — | — | — | — | — | — |
| Comp. 25 | MB25 | 100-130 | — | — | — | 20 | — | — | 2 | 78 | — | — | — | — | — | — | — | — |
| Comp. 26 | MB26 | 100-130 | — | — | — | 20 | — | — | 2 | — | 78 | — | — | — | — | — | — | — |
| 27 | MB27 | 100-130 | — | 65 | — | 35 | — | — | — | — | — | — | — | — | — | — | — | — |
| 28 | MB28 | 100-130 | — | 60 | — | 40 | — | — | — | — | — | — | — | — | — | — | — | — |
| 29 | MB29 | 100-130 | — | 65 | — | 45 | — | — | — | — | — | — | — | — | — | — | — | — |

TABLE F

| Example | Pressed Plate | MB1 | MB2 | MB3 | MB4 | MB5 | P3 | Temp. [° C.] | Processing time [min] |
|---|---|---|---|---|---|---|---|---|---|
| 51 | 20MB1 | 20 | — | — | — | — | 80 | 200 | 2 |
| 52 | 20MB2 | — | 20 | — | — | — | 80 | 200 | 2 |
| Comp. 53 | 20MB3 | — | — | 20 | — | — | 80 | 200 | 2 |
| 54 | 20MB4 | — | — | — | 20 | — | 80 | 200 | 2 |
| Comp. 55 | 20MB5 | — | — | — | — | 20 | 80 | 200 | 2 |
| Comp. 61 | 30MB1 | 30 | — | — | — | — | 70 | 200 | 2 |
| 62 | 30MB2 | — | 30 | — | — | — | 70 | 200 | 2 |
| Comp. 63 | 30MB3 | — | — | 30 | — | — | 70 | 200 | 2 |
| 64 | 30MB4 | — | — | — | 30 | — | 70 | 200 | 2 |
| Comp. 65 | 30MB5 | — | — | — | — | 30 | 70 | 200 | 2 |
| 71 | 40MB1 | 40 | — | — | — | — | 60 | 200 | 2 |
| 72 | 40MB2 | — | 40 | — | — | — | 60 | 200 | 2 |
| Comp. 73 | 40MB3 | — | — | 40 | — | — | 60 | 200 | 2 |
| 74 | 40MB4 | — | — | — | 40 | — | 60 | 200 | 2 |
| Comp. 75 | 40MB5 | — | — | — | — | 40 | 60 | 200 | 2 |

TABLE G

| Example | Flat Film | components used [parts] | | | | | | Temp. [° C.] |
|---|---|---|---|---|---|---|---|---|
| | | MB10 | MB11 | MB12 | MB13 | MB5 | P2 | |
| 80 | FF10 | 30 | — | — | — | — | 70 | 175-190 |
| 81 | FF11 | — | 30 | — | — | — | 70 | 175-190 |
| Comp. 82 | FF12 | — | — | 50 | — | — | 50 | 175-190 |
| 83 | 20MB4 | — | — | — | 30 | — | 70 | 175-190 |

| Example | Extruded Plate | components used [parts] | | | | Temp. [° C.] |
|---|---|---|---|---|---|---|
| | | MB20 | MB21 | MB22 | MB23 | |
| Comp. 90 | EP20 | 100 | — | — | — | 260-275 |
| 91 | EP21 | 95 | — | 5 | — | 260-275 |
| 92 | EP22 | 95 | — | — | 5 | 260-275 |
| Comp. 93 | EP23 | — | 100 | — | — | 260-275 |
| 94 | EP24 | — | 95 | 5 | — | 260-275 |

TABLE H

| Example | Compound | components used [parts] | | | | | Temp. [° C.] |
|---|---|---|---|---|---|---|---|
| | | MB20 | MB21 | A1 | B1 | D4 | |
| Comp. 30 | CP30 | 100 | — | — | — | — | 160-275 |
| 31 | CP31 | 95.0 | — | 4.0 | 1.0 | — | 160-275 |
| Comp. 32 | CP32 | 95.0 | — | — | 1.0 | 4.0 | 160-275 |
| Comp. 33 | CP33 | 96.0 | — | — | — | 4.0 | 160-275 |
| 34 | CP34 | 96.0 | — | 4.0 | — | — | 160-275 |
| Comp. 35 | CP35 | 99.0 | — | — | 1.0 | — | 160-275 |
| Comp. 36 | CP36 | — | 100.0 | — | — | — | 160-275 |
| 37 | CP37 | — | 95.0 | 4.0 | 1.0 | — | 160-275 |
| Comp. 38 | CP38 | — | 95.0 | — | 1.0 | 4.0 | 160-275 |
| Comp. 39 | CP39 | — | 96.0 | — | — | 4.0 | 160-275 |
| 40 | CP40 | — | 96.0 | 4.0 | — | — | 160-275 |
| Comp. 41 | CP41 | — | 99.0 | — | 1.0 | — | 160-275 |

TABLE I

| Example | Compound used 100% Dosage | Extruded plate Designation | Torque [Nm] | Melt pressure [bar] | Surface resistance SR-2 [Ohm] |
|---|---|---|---|---|---|
| Comp. 100 | CP30 | 100CP30 | 81.2 | 225 | 1.05 |
| 101 | CP31 | 100CP31 | 64.9 | 187 | 0.83 |
| Comp. 102 | CP32 | 100CP32 | 67.5 | 191 | 0.94 |
| Comp. 103 | CP33 | 100CP33 | 61.0 | 176 | 0.90 |
| 104 | CP34 | 100CP34 | 60.0 | 165 | 0.85 |
| Comp. 105 | CP35 | 100CP35 | 82.6 | 217 | 1.00 |
| Comp. 106 | CP36 | 100CP36 | 72.0 | 250 | 0.73 |
| 107 | CP37 | 100CP37 | 53.3 | 194 | 0.65 |
| Comp. 108 | CP38 | 100CP38 | 57.0 | 210 | 0.76 |
| Comp. 109 | CP39 | 100CP39 | 50.0 | 181 | 1.06 |

The invention claimed is:

1. A composition Z comprising a component A and a component B, wherein
the component A is a propylene-olefin-copolymer wax, and
the component B is a carbon nanotube,
with the propylene-olefin-copolymer wax being made of the monomers propylene and of from 0.1 to 50% by weight of at least one compound of formula (II),

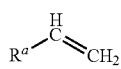

(II)

with $R^a$ being selected from the group consisting of H and unbranched or branched $C_{2-18}$ alkyl;
with the % by weight being based on the total weight of the monomers.

2. A composition Z according to claim 1, wherein $R^a$ is H.

3. A composition Z according to claim 1 wherein the composition Z contains graphite and optionally conductive carbon black.

4. A composition Z according to claim 1, wherein the composition Z contains no graphite and no carbon black.

5. A composition Z according to claim 1, wherein the composition Z comprises
0.05 to 99.95% by weight of component A,
0.05 to 99.95% by weight of component B;
the % by weight being based on the weight of the total composition Z.

6. A composition Z according to claim 1, wherein the composition Z contains of from 10 to 100% by weight, with the % by weight being based on the total weight of the composition Z, of the sum of the components A and B.

7. A composition Z according to claim 1, wherein the composition Z contains an organic polymer as a further component P.

8. A composition Z according to claim 7, wherein the component P is selected from the group consisting of thermoplastic polycondensates, styrene polymers, polyamides, polyesters, polycarbonates, polyacrylates, polyacrylate copolymers, polyacetals, polyadducts, polyolefins, polyolefin copolymers and mixtures of thereof.

9. A composition Z according to claim 7, wherein the composition Z comprises
of from 5 to 99.9% by weight of component P,
of from 0.1 to 95% by weight of the sum of component A and component B;
with the % by weight being based in each case on the total weight of the composition Z.

10. A composition Z according to claim 7, wherein the composition Z is a conductive polymer CP and comprises
from 2.5 to 10% by weight of component A;
from 0.1 to 10% by weight of component B,
from 50 to 90% by weight of graphite;
from 10 to 47.4% by weight of component P;
with the % by weight being based in each case on the total weight of the composition Z.

11. A composition Z according to claim 1, wherein the composition Z contains a dispersant as a further component C.

12. A composition Z according to claim 1, wherein the composition Z contains at least one wax other than a propylene-olefin-copolymer wax as component D.

13. A composition Z according to claim 1, wherein the composition Z contains a copolymer of ethylene and methyl acrylate as a further component E.

14. A process for producing a composition Z as defined in claim 1, comprising the step of physically mixing the component A and the component B.

15. A conductive polymer CP comprising a composition Z as claimed in claim 1.

16. The conductive polymer CP as claimed in claim 15 wherein the conductive polymer CP is used in gas and energy storage materials, in conductor tracks, in electrode materials, as emitter in displays, in composite materials for improving the electrical or thermal conductivity or for conductive coatings.

* * * * *